United States Patent
Henry et al.

(10) Patent No.: US 12,244,815 B2
(45) Date of Patent: *Mar. 4, 2025

(54) METHODS AND DEVICES FOR CODING AND DECODING A DATA STREAM REPRESENTING AT LEAST ONE IMAGE

(71) Applicant: ORANGE, Issy-les-Moulineaux (FR)

(72) Inventors: Félix Henry, Chatillon (FR); Mohsen Abdoli, Chatillon (FR); Pierrick Philippe, Chatillon (FR); Gordon Clare, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/171,934

(22) Filed: Feb. 21, 2023

(65) Prior Publication Data

US 2023/0199193 A1 Jun. 22, 2023

Related U.S. Application Data

(63) Continuation of application No. 17/277,972, filed as application No. PCT/FR2019/052028 on Sep. 3, 2019, now Pat. No. 11,616,958.

(30) Foreign Application Priority Data

Sep. 21, 2018 (FR) ...................................... 1858571

(51) Int. Cl.
*H04N 19/136* (2014.01)
*H04N 19/119* (2014.01)
(Continued)

(52) U.S. Cl.
CPC ......... *H04N 19/136* (2014.11); *H04N 19/119* (2014.11); *H04N 19/176* (2014.11); *H04N 19/61* (2014.11)

(58) Field of Classification Search
CPC ...... H04N 19/70; H04N 19/12; H04N 19/105; H04N 19/159; H04N 19/593;
(Continued)

(56) References Cited

U.S. PATENT DOCUMENTS

| 9,253,508 B2 | 2/2016 | Gao et al. |
| 10,880,552 B2 | 12/2020 | Lee et al. |

(Continued)

FOREIGN PATENT DOCUMENTS

| WO | 2013039908 A2 | 3/2013 |
| WO | 2013039908 A3 | 3/2013 |
| WO | 2018062892 A1 | 4/2018 |

OTHER PUBLICATIONS

Machine translation and European Communication dated Feb. 6, 2024 for corresponding European Application No. 19786368.1.
(Continued)

*Primary Examiner* — Daniel Chang
(74) *Attorney, Agent, or Firm* — David D. Brush; Westman, Champlin & Koehler, P.A.

(57) ABSTRACT

A method for decoding a coded data stream representing an image. The method includes for a current block: reading from the stream a block size threshold value; determining whether the current block size is less than or equal to the threshold value; if so, decoding information indicating a first or second coding mode and reconstructing the current block according to the indicated mode, and if not, reconstructing the current block according to the first mode. In the first mode the current block is reconstructed using an inverse transform of a transformed prediction residue decoded for the current block, and in the second mode the current block is not reconstructed using such an inverse transform, but by: scanning each pixel of the block, including: obtaining a prediction of the pixel from another previously decoded (Continued)

Figure 1:
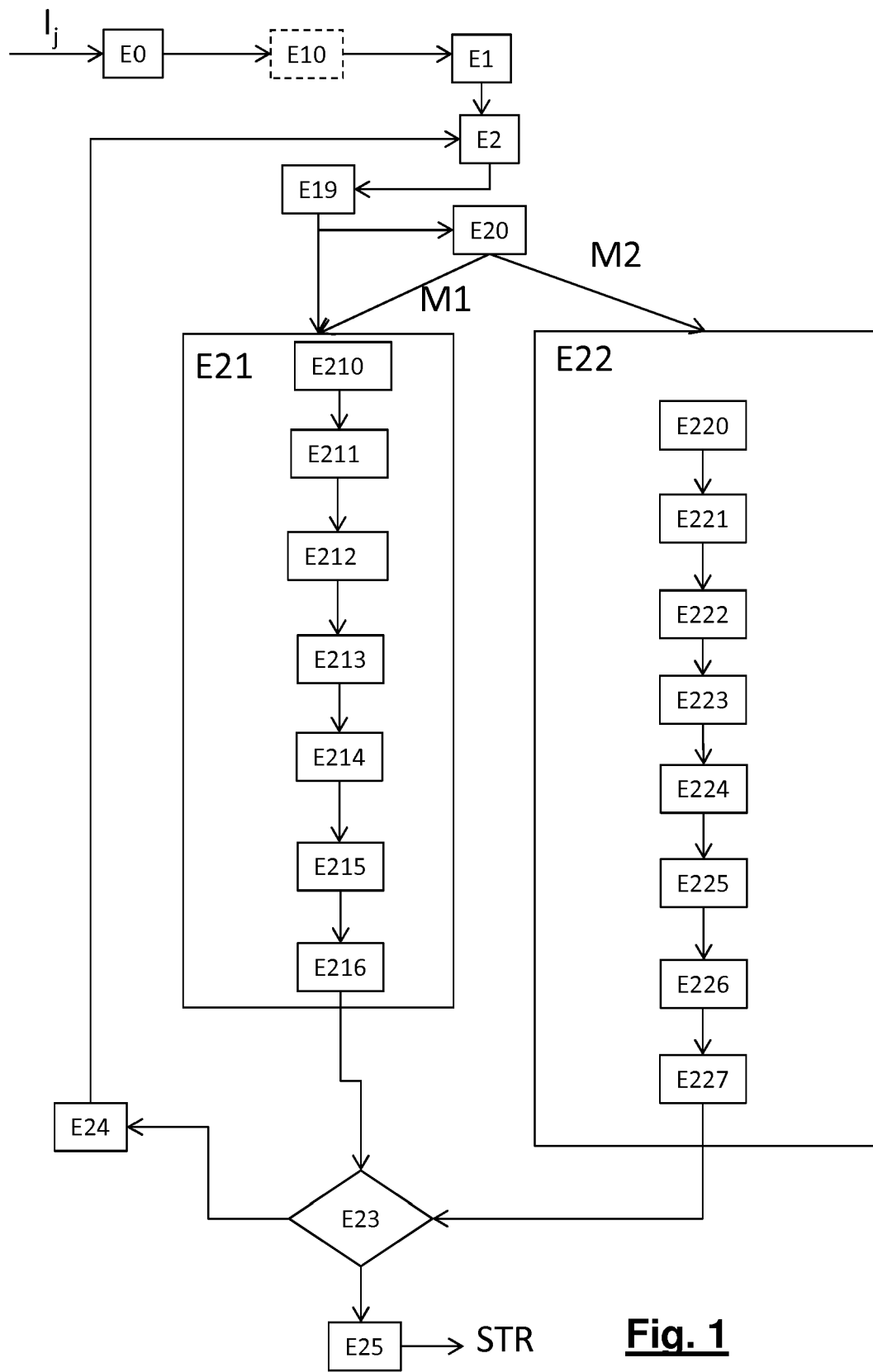

pixel, and reconstructing the pixel from the prediction and a decoded prediction residue.

16 Claims, 4 Drawing Sheets

(51) Int. Cl.
  *H04N 19/176* (2014.01)
  *H04N 19/61* (2014.01)
(58) Field of Classification Search
  CPC ...... H04N 19/122; H04N 19/46; H04N 19/11; H04N 19/60; H04N 19/129; H04N 19/103
  See application file for complete search history.

(56) References Cited

U.S. PATENT DOCUMENTS

| | | | | |
|---|---|---|---|---|
| 2006/0056719 | A1* | 3/2006 | Yu | H04N 19/557 375/E7.118 |
| 2008/0222380 | A1* | 9/2008 | Sze | G06F 9/5016 711/170 |
| 2012/0177107 | A1* | 7/2012 | Fu | H04N 19/70 375/240.03 |
| 2012/0195356 | A1* | 8/2012 | Yi | H04N 19/156 375/240.03 |
| 2013/0128966 | A1* | 5/2013 | Gao | H04N 19/157 375/240.12 |
| 2013/0136175 | A1 | 5/2013 | Wang et al. | |
| 2013/0279577 | A1* | 10/2013 | Schwarz | H04N 19/52 375/240.12 |
| 2013/0343464 | A1* | 12/2013 | Van der Auwera | H04N 19/60 375/240.18 |
| 2014/0044171 | A1* | 2/2014 | Takehara | H04N 19/52 375/240.14 |
| 2014/0226721 | A1* | 8/2014 | Joshi | H04N 19/176 375/240.12 |
| 2014/0286413 | A1* | 9/2014 | Joshi | H04N 19/467 375/240.12 |
| 2015/0172658 | A1* | 6/2015 | Kim | H04N 19/157 |
| 2016/0105676 | A1* | 4/2016 | Pu | H04N 19/186 375/240.24 |
| 2016/0366437 | A1* | 12/2016 | Zhou | H04N 19/593 |
| 2017/0150186 | A1* | 5/2017 | Zhang | H04N 19/119 |
| 2017/0223380 | A1* | 8/2017 | Lee | H04N 19/61 |
| 2017/0374369 | A1* | 12/2017 | Chuang | H04N 19/70 |
| 2018/0027235 | A1* | 1/2018 | Lin | H04N 19/182 382/233 |
| 2018/0213247 | A1* | 7/2018 | Huang | H04N 19/157 |
| 2019/0089960 | A1* | 3/2019 | Chen | H04N 19/176 |
| 2019/0222835 | A1* | 7/2019 | Panusopone | H04N 19/82 |
| 2019/0230364 | A1 | 7/2019 | Lee et al. | |
| 2019/0342568 | A1* | 11/2019 | Zhao | H04N 19/149 |
| 2020/0053359 | A1* | 2/2020 | Lee | H04N 19/176 |
| 2020/0099933 | A1* | 3/2020 | Tanner | H04N 19/103 |
| 2020/0252608 | A1* | 8/2020 | Ramasubramonian | H04N 19/119 |
| 2020/0322617 | A1* | 10/2020 | Zhao | H04N 19/119 |
| 2021/0258576 | A1* | 8/2021 | LeLeannec | H04N 19/124 |
| 2021/0377541 | A1* | 12/2021 | Henry | H04N 19/61 |
| 2022/0086439 | A1* | 3/2022 | Tsai | H04N 19/186 |
| 2022/0124347 | A1* | 4/2022 | Chen | H04N 19/70 |
| 2022/0141466 | A1* | 5/2022 | Chen | H04N 19/12 375/240.12 |

OTHER PUBLICATIONS

Heiko Schwarz et al., "Chapter 3: Block Structures and Parallelism Features in HEVC" In: "High Efficiency Video Coding (HEVC)", Aug. 23, 2014 (Aug. 23, 2014), Springer International Publishing, Cham, XP055614176.
Japanese Notice of Reasons for Rejection dated Aug. 28, 2023, for corresponding Japanese Application No. 2021-515493.
Yoo, S. et al., "A known tool investigation—Implementation of short-distance intra prediction (SDIP) on KTA-2. 0," Study Group 16—Contribution 1025, COM16-C1025-E, ITU-T, Sep. 2015.
International Search Report dated Jan. 7, 2020 for corresponding International Application No. PCT/FR2019/052028, Sep. 3, 2019.
Written Opinion of the International Searching Authority dated Jan. 7, 2020 for corresponding International Application No. PCT/FR2019/052028, filed Sep. 3, 2019.
Xiaoran Cao et al. "Short Distance Intra Coding Scheme for High Efficiency Video Coding" IEEE Transactions on Image Processing, IEEE Service Center, Piscataway, NJ, US, vol. 22, No. 2, Feb. 1, 2013 (Feb. 1, 2013), pp. 790-801, DOI: 10.1109/TIP.2012.2222904, ISSN: 1057-7149, XP011492284.
Abdoli Mohsen et al. "Intra prediction using in-loop residual coding for the post-HEVC standard" 2017 IEEE 19th International Workshop on Multimedia Signal Processing (MMSP), IEEE, Oct. 16, 2017 (Oct. 16, 2017), pp. 1-6, DOI: 10.1109/MMSP.2017.8122241, XP033271573.
Sanchez Victor et al. "Lossless compression of medical images based on HEVC intra coding" 2014 IEEE International Conference on Acoustics, Speech and Signal Processing (ICASSP), IEEE, May 4, 2014 (May 4, 2014), pp. 6622-6626, DOI: 10.1109/ICASSP.2014.6854881, XP032616688.
Limin Liu et al. "Enhanced Intra Prediction Using Context-Adaptive Linear Prediction (Abstract)" 26. Picture Coding Symposium; Jul. 11, 2007-Sep. 11, 2007; Lisbon, Nov. 7, 2007 (Nov. 7, 2007), XP030080404.
Jianle Chen et al. "Adaptive linear prediction for block-based lossy image coding" Image Processing (ICIP), 2009 16th IEEE International Conference on, IEEE, Piscataway, NJ, USA, Nov. 7, 2009 (Nov. 7, 2009), pp. 2833-2836, DOI: 10.1109/ICIP.2009.5414476, ISBN: 978-1-4244-5653-6, XP031629140.
Yumi Sohn et al. "One Dimensional Transform For H.264 Based Intra Coding (Abstract)" 26. Picture Coding Symposium; Jul. 11, 2007-Sep. 11, 2007; Lisbon, Nov. 7, 2007 (Nov. 7, 2007), XP030080458.
Yung-Lyu et al. "Improved lossless intra coding for H.264/MPEG-4 AVC" IEEE Transactions on Image Processing, vol. 15, No. 9, Sep. 1, 2006 (Sep. 1, 2006), pp. 2610-2615, DOI: 10.1109/TIP.2006.877396, ISSN: 1057-7149, XP055010349.
Abdoli (Orange) M et al. "AHG11: Block DPCM for Screen Content Coding", No. JVET-L0078, Sep. 24, 2018 (Sep. 24, 2018), 12. JVET Meeting; Oct. 3, 2018-Oct. 12, 2018; Macao; (The Joint Video Exploration Team of ISO/IEC JTC1/ SC29/WG11 and ITU-T SG.16), Retrieved from the Internet: http://phenix.int-evry.fr/jvet/doc_end_user/documents/12_Macao/wg11/JVET-L0078-v1.zip JVET-L0078.docx [retrieved on Sep. 24, 2018] XP030193623.
Matthias Wien, "High Efficiency Video Coding, Coding Tools and Specification", Signals and Communication Technology, 2015.
Notice of Allowance and Fees Due for U.S. Appl. No. 17/277,972, mailed Dec. 20, 2022, 12 pages.
Advisory Action for U.S. Appl. No. 17/277,972, mailed Oct. 28, 2022, 6 pages.
Final Office Action for U.S. Appl. No. 17/277,972, mailed Aug. 25, 2022, 21 pages.
Non-Final Office Action for U.S. Appl. No. 17/277,972, mailed Mar. 3, 2022, 11 pages.

* cited by examiner

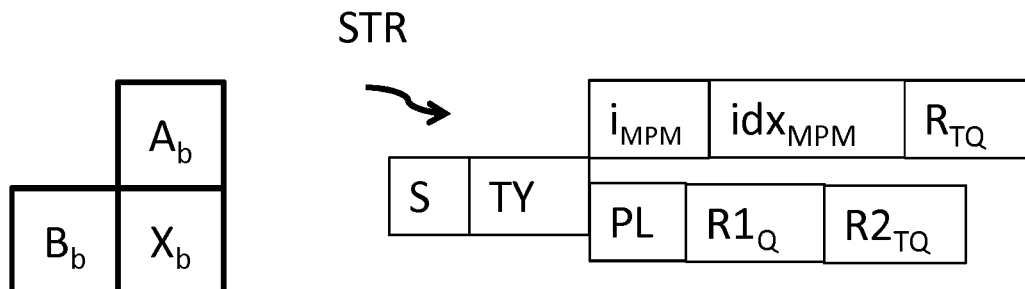
Fig. 2
Fig. 5
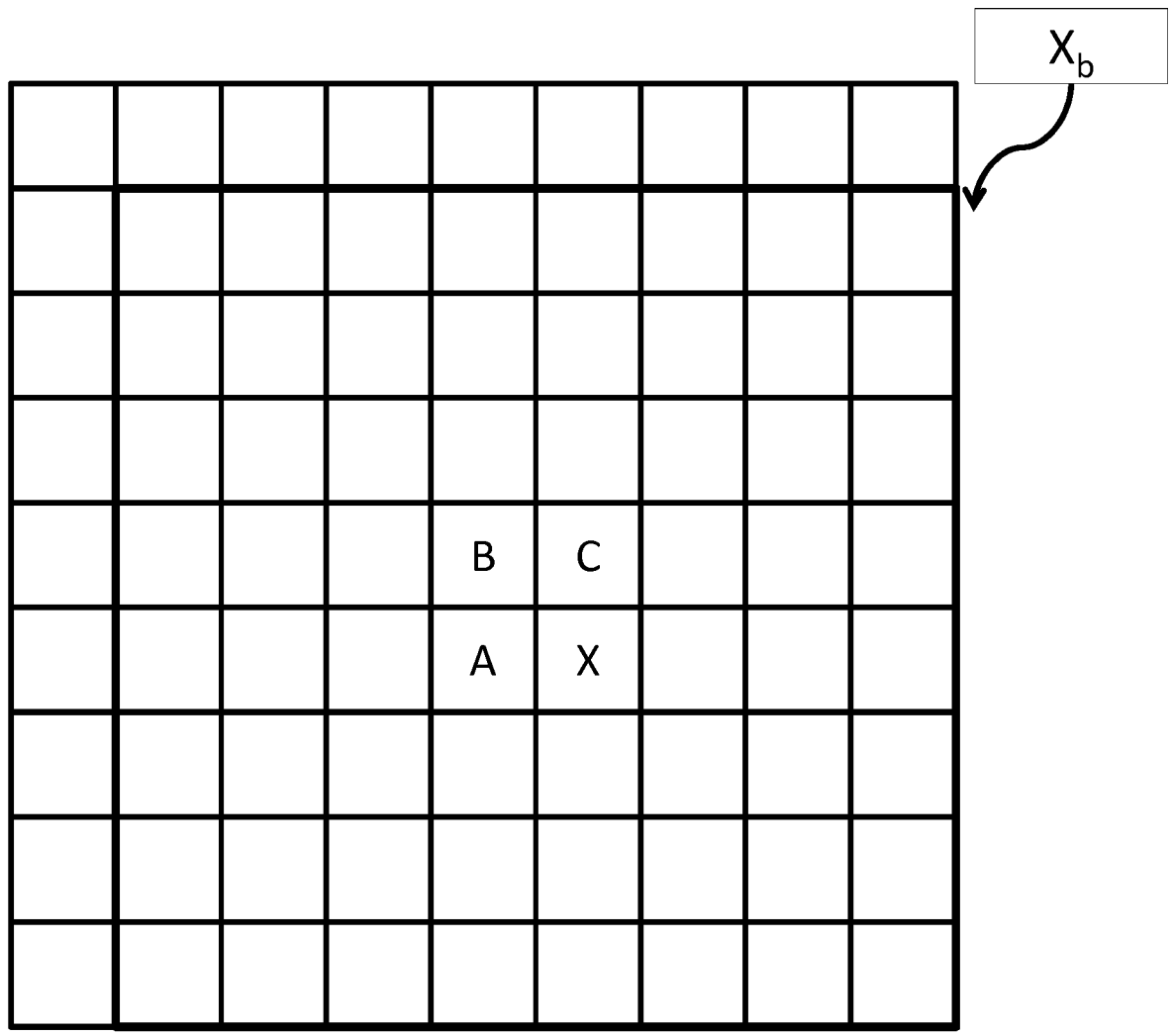
Fig. 3

METHODS AND DEVICES FOR CODING AND DECODING A DATA STREAM REPRESENTING AT LEAST ONE IMAGE

CROSS-REFERENCE TO RELATED APPLICATIONS

This Application is continuation of U.S. application Ser. No. 17/277,972, filed Mar. 19, 2021, which is a Section 371 National Stage Application of International Application No. PCT/FR2019/052028, filed Sep. 3, 2019, and published as WO 2020/058594 A1 on Mar. 26, 2020, not in English, the entire contents of which are incorporated herein by reference.

1. FIELD OF THE INVENTION

The field of the invention is that of coding and decoding images or sequences of images, and in particular video streams.

More specifically, the invention relates to the compression of images or sequences of images using a block representation of the images.

The invention can notably be applied to the image or video coding implemented in the current or future encoders (JPEG, MPEG, H.264, HEVC, etc. and their amendments), and to the corresponding decoding.

2. PRIOR ART

Digital images and sequences of images take up a lot of space in terms of memory, which requires, when transmitting these images, to compress them in order to avoid congestion problems on the network used for this transmission.

Many techniques for compressing video data are already known. Among these, the HEVC compression standard ("High Efficiency Video Coding, Coding Tools and Specification", Matthias Wien, Signals and Communication Technology, 2015) proposes to implement a prediction of pixels of a current image in relation to other pixels belonging to the same image (intra prediction) or to a previous or subsequent image (inter prediction).

More specifically, the intra prediction uses the spatial redundancies within an image. To do this, the images are split into blocks of pixels. The blocks of pixels are then predicted using already reconstructed information, corresponding to the previously coded/decoded blocks in the current image according to the scanning order of the blocks in the image.

Furthermore, in a standard manner, the coding of a current block is carried out using a prediction of the current block, referred to as the predictor block, and a prediction residue or "residual block", corresponding to a difference between the current block and the predictor block. The resulting residual block is then transformed, for example using a DCT (discrete cosine transform) type transform. The coefficients of the transformed residual block are then quantized, coded by entropy coding and transmitted to the decoder, that can reconstruct the current block by adding this residual block to the predictor block.

The decoding is done image by image, and for each image, block by block. For each block, the corresponding elements of the stream are read. The inverse quantization and the inverse transform of the coefficients of the residual block are performed. Then, the block prediction is calculated to obtain the predictor block, and the current block is reconstructed by adding the prediction (i.e. the predictor block) to the decoded residual block.

In U.S. Pat. No. 9,253,508, a DPCM (Differential Pulse Code Modulation) coding technique for coding blocks in intra mode is integrated into an HEVC encoder. Such a technique consists in predicting a set of pixels of an intra block by another set of pixels of the same block that have been previously reconstructed. In U.S. Pat. No. 9,253,508, a set of pixels of the intra block to be coded corresponds to a row of the block, or a column, or a row and a column, and the intra prediction used to predict the set of pixels is one of the directional intra predictions defined in the HEVC standard.

However, such a technique is not optimal. Indeed, the reconstruction of a set of pixels of the intra block corresponds either to the addition of a prediction residue in the case of a lossless coding, thus offering a fairly low compression ratio, or to the addition of a prediction residue after inverse transform and/or inverse quantization of said other set of pixels serving as a prediction. Such a technique thus does not enable each pixel of the intra block to be predicted using a local prediction function and the predicted pixel to be reconstructed before a subsequent pixel is predicted. Indeed, this technique requires a set of pixels (row/column of the block for example) to be reconstructed to predict another set of pixels. In other words, with each prediction and reconstruction of a part of the block, several pixels of the block are predicted and reconstructed.

Moreover, in U.S. Pat. No. 9,253,508, it is not described how to make conventional intra prediction modes as defined in the HEVC standard for example and the DPCM prediction mode coexist.

There is therefore a need for a new coding and decoding method to improve the compression of image or video data.

3. SUMMARY OF THE INVENTION

The invention improves the state of the art. For this purpose, it relates to a method for decoding a coded data stream representative of at least one image that is split into blocks. The decoding method comprises, for at least one block of the image, referred to as the current block:
  determining whether the size of the current block is less than or equal to a predetermined threshold,
  if the size of the current block is less than or equal to the predetermined threshold, the method comprises decoding an item of information indicating a coding mode of the current block among a first coding mode and a second coding mode and reconstructing the current block according to the coding mode indicated by the decoded coding mode item of information,
  if the size of the current block is greater than the predetermined threshold, reconstructing the current block according to the first coding mode.

The first coding mode corresponds to a coding mode according to which the current block is reconstructed using an inverse transform of a transformed prediction residue decoded for the current block, and the second coding mode corresponds to a coding mode according to which the current block is reconstructed by:
  for each pixel of the current block:
    obtaining a prediction of said pixel from another previously decoded pixel, said other previously decoded pixel belonging to said current block or to a previously decoded block of the image, reconstructing said pixel from the prediction of said pixel obtained and a decoded prediction residue associated with said pixel.

Thus, according to the invention, an item of information indicating a coding mode of the current block among a conventional intra coding mode and a coding mode using a prediction based on previously reconstructed pixels of the current block, is coded/decoded in the stream only in the case where the current block has a size less than or equal to a predetermined threshold. In the case where the current block has a size greater than the predetermined threshold, the current block can for example be coded by the conventional intra coding mode by default, for example in the case of coding an INTRA type image, or by any other coding mode.

The advantage of indicating the coding mode between the first coding mode and the second coding mode only for the blocks having a size less than or equal to a predetermined threshold is to gain in rate. Indeed, the second coding mode requires the transmission of a residue for each pixel and therefore requires a rate proportional to the area of the block expressed in number of pixels. The second coding mode is interesting in terms of compression compared to the first coding mode when the current block has a small size.

Moreover, the hardware implementation cost at the decoder is reduced since the circuits supporting the decoding of a block according to the second coding mode can be limited to a small area of the block.

Advantageously, the invention also allows a gain in speed at the encoder since the encoder then does not have to test the two coding modes for large block sizes, which also consume the most computing time.

The invention also relates to a method for coding a data stream representative of at least one image that is split into blocks. According to the invention, the coding method comprises, for at least one block of the image, referred to as the current block:
  determining whether the size of the current block is less than or equal to a predetermined threshold,
  if the size of the current block is less than or equal to the predetermined threshold, the method comprises coding an item of information indicating a coding mode of the current block among a first coding mode and a second coding mode and coding the current block according to the coding mode indicated by the coded coding mode item of information,
  if the size of the current block is greater than the predetermined threshold, coding the current block according to the first coding mode.

The first coding mode corresponds to a coding mode according to which the current block is coded using a transform of a prediction residue of the current block, and the second coding mode corresponds to a coding mode according to which the current block is coded by:
  for each pixel of the current block:
    obtaining a prediction of said pixel from another previously decoded pixel, said other previously decoded pixel belonging to said current block or to a previously decoded block of the image,
    coding a prediction residue associated with said pixel and obtained from the prediction obtained for said pixel.

According to a particular embodiment of the invention, the size of the current block corresponds to the greatest width of the current block. For example, the predetermined threshold is 16 pixels or 32 pixels. Other threshold values are of course possible.

According to another particular embodiment of the invention, the size of the current block corresponds to the total number of pixels in the current block. For example, the predetermined threshold is 256 pixels or 512 pixels. Other threshold values are of course possible.

According to any one of the particular embodiments mentioned above, the threshold value can be adjusted depending on the maximum size of an initial split block of the image.

According to another particular embodiment of the invention, the predetermined threshold is decoded or coded in the data stream.

The invention also relates to a decoding device configured to implement the decoding method according to any one of the particular embodiments defined above. This decoding device could, of course, comprise the different characteristics relating to the decoding method according to the invention. Thus, the characteristics and advantages of this decoding device are the same as those of the decoding method, and they are not detailed further.

The decoding device comprises in particular a processor configured, for at least one block of the image, referred to as the current block, to:
  determine whether the size of the current block is less than or equal to a predetermined threshold,
  if the size of the current block is less than or equal to the predetermined threshold, decode an item of information indicating a coding mode of the current block among a first coding mode and a second coding mode, and reconstruct the current block according to the coding mode indicated by the decoded coding mode item of information,
  if the size of the current block is greater than the predetermined threshold, reconstruct the current block according to the first coding mode,
the first coding mode corresponding to a coding mode according to which the current block is reconstructed using an inverse transform of a transformed prediction residue decoded for the current block, the second coding mode corresponding to a coding mode according to which the current block is reconstructed by:
  for each pixel of the current block:
    obtaining a prediction of said pixel from another previously decoded pixel, said other previously decoded pixel belonging to said current block or to a previously decoded block of the image,
    reconstructing said pixel from the prediction of said pixel obtained and a decoded prediction residue associated with said pixel.

According to a particular embodiment of the invention, such a decoding device is comprised in a terminal.

The invention also relates to a coding device configured to implement the coding method according to any one of the particular embodiments defined above. This coding device could, of course, comprise the different characteristics relating to the coding method according to the invention. Thus, the characteristics and advantages of this coding device are the same as those of the coding method, and they are not detailed further.

The coding device notably comprises a processor configured, for at least one block of the image, referred to as the current block, having a size less than or equal to a predetermined threshold, to:
  determine whether the size of the current block is less than or equal to a predetermined threshold,
  if the size of the current block is less than or equal to the predetermined threshold, code an item of information indicating a coding mode of the current block among a first coding mode and a second coding mode, and code the current block according to the coding mode indicated by the coded coding mode item of information, if the size of the current block is greater than the predetermined threshold, code the current block according to the first coding mode, the first coding mode corresponding to a coding mode according to which the current block is coded using a transform of a prediction residue of the current block, the second coding mode corresponding to a coding mode according to which the current block is coded by:

for each pixel of the current block:
obtaining a prediction of said pixel from another previously decoded pixel, said other previously decoded pixel belonging to said current block or to a previously decoded block of the image,
coding a prediction residue associated with said pixel and obtained from the prediction obtained for said pixel.

According to a particular embodiment of the invention, such a coding device is comprised in a terminal, or a server.

The invention also relates to a coded data stream representative of at least one image that is split into blocks. According to the invention, the coded data stream comprises, for at least one block of the image, referred to as the current block, an item of information indicating a coding mode of the current block among a first coding mode and a second coding mode, if the current block has a size less than or equal to a predetermined threshold.

When the coding mode of the current block corresponds to a first coding mode or if the size of the current block has a size greater than the predetermined threshold, the coded data stream comprises a coded transformed prediction residue.

When the coding mode of the current block corresponds to a second coding mode and the size of the current block has a size less than or equal to the predetermined threshold, the coded data stream comprises a coded prediction residue obtained by:

for each pixel of the current block:
obtaining a prediction of said pixel from another previously decoded pixel, said other previously decoded pixel belonging to said current block or to a previously decoded block of the image,
obtaining a prediction residue associated with said pixel from the prediction obtained for said pixel.

According to a particular embodiment of the invention, the coded data stream further comprises a value representative of said predetermined threshold coded at least for said image.

The data stream according to any one of the particular embodiments described above can be stored on any storage medium, for example a memory, or transmitted in the form of an electrical or optical signal, that can be carried via an electrical or optical cable, by radio or by other means.

The decoding method, respectively the coding method, according to the invention can be implemented in various ways, notably in wired form or in software form. According to a particular embodiment of the invention, the decoding method, respectively the coding method, is implemented by a computer program. The invention also relates to a computer program comprising instructions for implementing the decoding method or the coding method according to any one of the particular embodiments previously described, when said program is executed by a processor. Such a program can use any programming language. It can be downloaded from a communication network and/or recorded on a computer-readable medium.

This program can use any programming language, and can be in the form of source code, object code, or intermediate code between source code and object code, such as in a partially compiled form, or in any other desirable form.

The invention also relates to a computer-readable storage medium or data medium comprising instructions of a computer program as mentioned above. The recording media mentioned above can be any entity or device able to store the program. For example, the medium can comprise a storage means such as a memory. On the other hand, the recording media can correspond to a transmissible medium such as an electrical or optical signal, that can be carried via an electrical or optical cable, by radio or by other means. The program according to the invention can be downloaded in particular on an Internet-type network.

Alternatively, the recording media can correspond to an integrated circuit in which the program is embedded, the circuit being adapted to execute or to be used in the execution of the method in question.

4. LIST OF FIGURES

Figure 4:
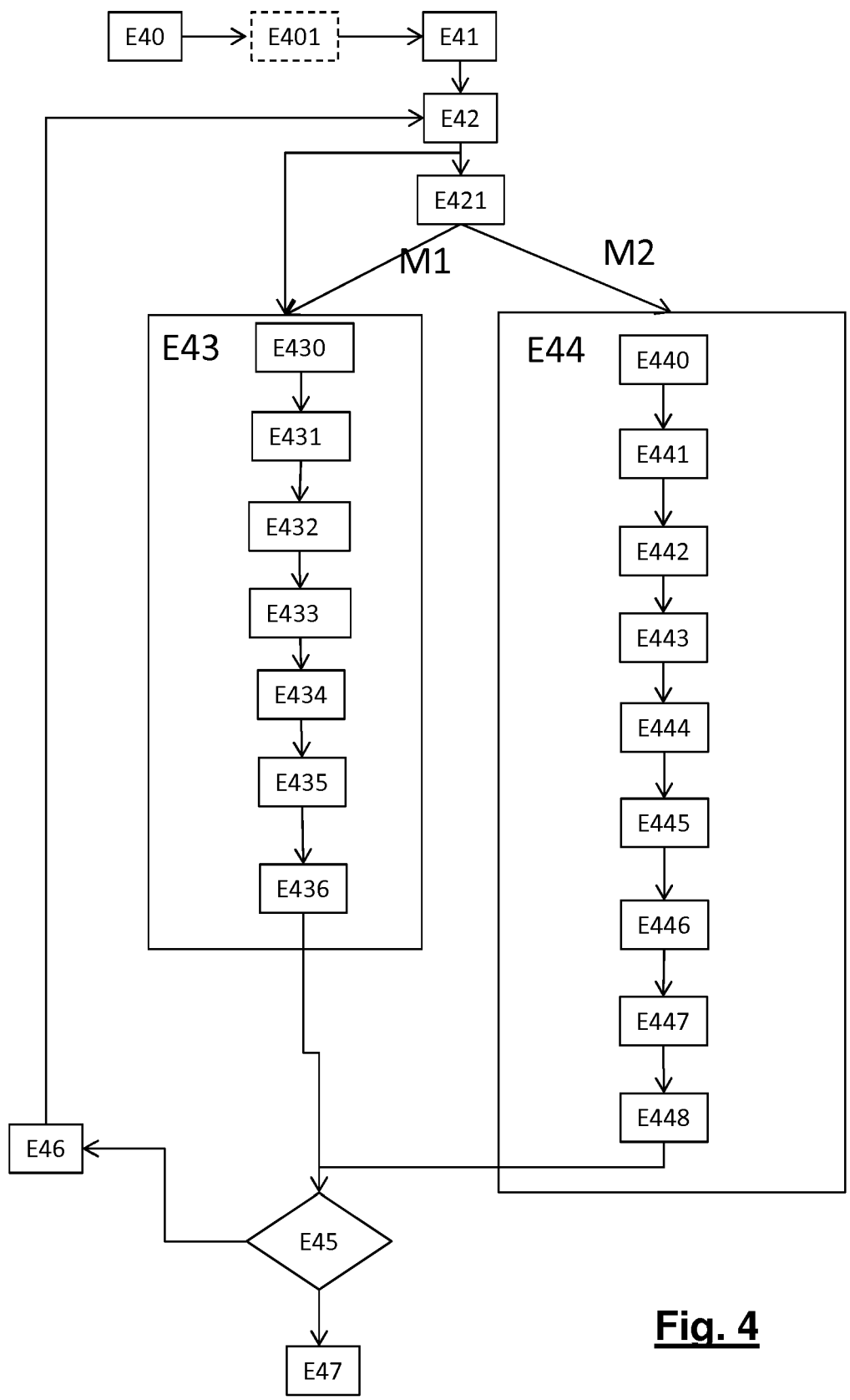
Figure 6:
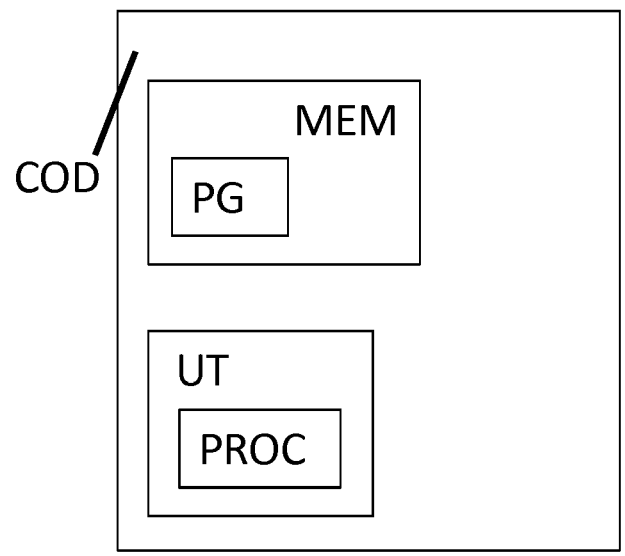
Figure 7:
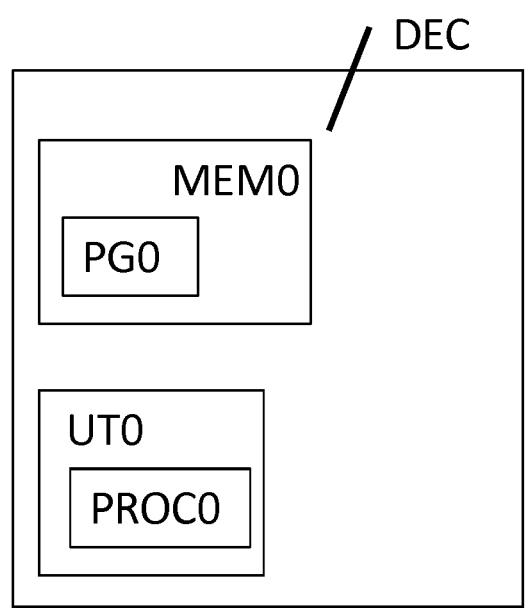

Other characteristics and advantages of the invention will emerge more clearly upon reading the following description of a particular embodiment, provided as a simple illustrative non-restrictive example, and the annexed drawings, wherein:

FIG. 1 shows steps of the coding method according to a particular embodiment of the invention, FIG. 2 illustrates a position example of the neighbouring blocks of a current block to determine an intra prediction mode according to a particular embodiment of the invention, FIG. 3 illustrates a position example of the reference pixels used to predict pixels of a current block according to a particular embodiment of the invention, FIG. 4 shows steps of the decoding method according to a particular embodiment of the invention, FIG. 5 illustrates a signal example comprising coded data representative of at least one block of an image according to a particular embodiment of the invention, FIG. 6 shows the simplified structure of a coding device adapted to implement the coding method according to any one of the particular embodiments of the invention, FIG. 7 shows the simplified structure of a decoding device adapted to implement the decoding method according to any one of the particular embodiments of the invention.

5. DESCRIPTION OF AN EMBODIMENT OF THE INVENTION

5.1 General Principle

The general principle of the invention is to allow improving the coding of a block of data of an image by using a new coding mode based on a prediction of the pixels of the block using other previously reconstructed pixels of the same block and to make this new coding mode coexist with conventional coding modes, for example as defined in current compression standards.

Thus, according to the invention, a new coding mode known as ILR (In Loop Residual) is defined according to which pixels of a block to be coded are predicted using other previously reconstructed pixels of the same block and a prediction residue for each pixel is transmitted to the decoder. This new coding mode is introduced in an encoder/decoder using conventional coding modes according to which the pixels of the block to be coded are predicted in relation to pixels of another previously reconstructed block and according to which a prediction residue for the block to be coded is transformed before being coded and transmitted to the decoder.

According to the invention, an item of information indicating a coding mode among a first coding mode (conventional mode) and a second coding mode (ILR mode) is coded if the block has a size less than or equal to a predetermined threshold. The first coding mode is then used by default when the block has a size greater than the predetermined threshold and no item of information is transmitted to indicate the choice of this coding mode among the first and second coding modes.

Thus, according to the invention, the ILR coding mode is only available for the blocks whose size is less than or equal to a given size. Indeed, the ILR coding technique requires the transmission of a residue for each pixel, whereas a conventional coding mode (INTRA or INTER) is based on coding a transformed residue, which is much cheaper to transmit.

It has been experimentally observed that, for a conventional coding mode according to which a prediction residue is transformed, the rate associated with a square block is on average proportional to the length of the side of the block.

However, by nature, the ILR approach corresponding to the coding mode according to which a prediction residue is not transformed before coding is an approach that requires a rate proportional to the area of the block expressed in number of pixels. Indeed, according to the ILR method, a residue must be transmitted for each pixel, and this residue is not transformed since it is necessary to be able to reconstruct the pixel in order to then predict other pixels of the same block.

The rate cost of the ILR approach therefore increases with the square of the width of a block, while the rate of the conventional approach increases proportionally to said width. The consequence is that, while the ILR approach can be superior to the conventional approach for small blocks, this is no longer the case for large blocks.

It has been experimentally confirmed that, even when letting an encoder put the two encoding modes into competition for all the block sizes, the ILR coding mode is almost never selected for block sizes above 16×16 pixels, due to its high rate.

There are therefore several advantages to not leaving the ILR coding mode active above a certain block size. It allows a gain in rate since it is no longer necessary, for large block sizes, to transmit an item of information identifying whether the current block must be decoded according to the conventional coding mode or the ILR coding mode.

Disabling the ILR coding mode for large blocks also allows a gain in speed at the encoder, since the encoder no longer has to test the two coding modes for large block sizes that consume the most computing resources.

Moreover, the hardware implementation cost of a decoder is reduced since the circuits supporting the decoding of a block according to the ILR coding mode can be limited to a small area of this block.

The general principle of the invention is therefore to test the two coding modes only if the size of the block is less than or equal to a predetermined threshold. For example, the criterion could be one of the following:

The greatest block width is less than or equal to 16 pixels,
The greatest block width is less than or equal to 32 pixels,
The total number of pixels in the block is less than or equal to 256 pixels,
The total number of pixels in the block is less than or equal to 512 pixels.

Other criteria are possible. If the criterion is met, the encoder will actually test the two coding modes mentioned above, choose the best one in the sense of a rate-distortion criterion, and transmit an indicator to the decoder to identify the chosen coding mode. If the criterion is not met (therefore, above a certain block size), the conventional coding mode is used, and no indicator is transmitted.

5. 2 Embodiments

FIG. 1 shows steps of the coding method according to a particular embodiment of the invention. For example, a sequence of images $I_1, I_2, \ldots, I_{Nb}$ is coded in the form of a coded data stream STR according to a particular embodiment of the invention. For example, such a coding method is implemented by a coding device as described later in relation to FIG. 6.

A sequence of images $I_1, I_2, \ldots, I_{Nb}$, Nb being the number of images of the sequence to be coded, is provided as input of the coding method. The coding method outputs a coded data stream STR representative of the sequence of images provided as input.

In a known manner, the coding of the sequence of images $I_1, I_2, \ldots, I_{Nb}$ is done image by image according to a coding order previously established and known to the encoder. For example, the images can be coded in the temporal order $I_1, I_2, \ldots, I_{Nb}$ or in another order, for example $I_1, I_3, I_2, \ldots, I_{Nb}$.

In a step E0, an image $I_j$ to be coded of the sequence of images $I_1, I_2, \ldots, I_{Nb}$ is split into blocks, for example into blocks of size 32×32 or 64×64 pixels or more. Such a block can be subdivided into square or rectangular sub-blocks, for example 16×16, 8×8, 4×4, 16×8, 8×16 . . . .

In step E0, a threshold is determined defining the maximum block size up to which the ILR coding mode can be used to code a current block. For example, the threshold can be set by default at the encoder or determined depending on the maximum block size used to split the image. For example, considering an initial split maximum size of 256×256 pixels, the threshold can correspond to a greater block width equal to 64, 32 or 16 pixels.

Considering an initial split maximum size of 128×128 pixels, the threshold can correspond to a greater block width equal to 64, 32, 16 or 8 pixels. The threshold can be adjusted depending on the content of the images to be coded. As a variant, several threshold values can be tested during a rate/distortion optimisation described below.

In an optional step E10, according to a particular embodiment of the invention, a value of the predetermined threshold is coded in the data stream STR, at the data coded for the image $I_j$ or at the data coded for the sequence of images.

Then, in a step E1, a first block or sub-block $X_b$ to be coded of the image $I_j$ is selected according to a predetermined scanning order of the image $I_j$. For example, it can be the first block in the lexicographical scanning order of the image.

In a step E2, the encoder will choose the coding mode to code the current block $X_b$.

According to the particular embodiment described here, the encoder selects the coding mode to code the current block $X_b$ from a first coding mode M1 and a second coding mode M2. Additional coding modes (not described here) can be used.

According to the particular embodiment described here, the first coding mode M1 corresponds to the coding of the current block by conventional intra prediction, for example as defined according to the HEVC standard, and the second coding mode M2 corresponds to the In-Loop Residual (ILR) prediction coding.

The principle of the invention can be extended to other types of coding modes, whether for the first coding mode M1 or the second coding mode M2. For example, the first coding mode can correspond to any type of coding modes using a transform of the prediction residue before quantizing the coefficients resulting from the transform operation (inter-image prediction coding, spatial prediction with template matching coding, etc.). The second coding mode corresponds to the ILR coding mode described above.

In step E2, the encoder can perform a rate/distortion optimisation to determine the best coding mode to code the current block. During this rate/distortion optimisation, additional coding modes distinct from the first and the second coding modes can be tested, for example an inter mode coding mode. During this rate/distortion optimisation, the encoder simulates the coding of the current block $X_b$ according to the different available coding modes in order to determine the rate and the distortion associated with each coding mode and selects the coding mode offering the best rate/distortion compromise, for example according to the D+λR function, where R is the rate required to code the current block according to the evaluated coding mode, D is the distortion measured between the decoded block and the original current block, and λ is a Lagrangian multiplier, for example entered by the user or defined at the encoder.

According to the invention, if the current block has a size greater than the threshold determined in step E0, the second coding mode is not tested.

In a step E19, it is determined whether the current block has a size less than or equal to the threshold determined in step E0. If the current block has a size less than or equal to the threshold, the process proceeds to step E20. Otherwise, the current block has a size greater than the threshold, the method proceeds to step E21 for coding the current block according to the first coding mode.

According to a particular embodiment of the invention, the size of the current block can correspond to the greatest width of the block. For example, if the current block is of size 16×32 pixels and the determined threshold is 32 pixels, in this case, the second coding mode is tested. However, if the current block is of size 64*32 pixels, in this case, the second coding mode is not tested.

According to another particular embodiment of the invention, the size of the current block can correspond to the number of pixels in the block. For example, for a threshold of 512 pixels, and a current block of 16*32 pixels thus containing 512 pixels, the second coding mode is tested whereas for a current block of 64*32 pixels thus containing 2048 pixels, the second coding mode is not tested.

In a step E20, an item of information indicating the coding mode selected for the current block is coded in the data stream STR.

If the current block $X_b$ is coded according to the first coding mode M1, the method proceeds to step E21 for coding the block according to M1. If the current block $X_b$ is coded according to the second coding mode M2, the method proceeds to step E22 for coding the block according to M2.

Step E21 for coding the block according to the first coding mode M1, according to a particular embodiment of the invention, is described below. According to the particular mode described here, the first coding mode corresponds to a conventional intra prediction, such as the one defined in the HEVC standard.

In a step E210, a quantization step $\delta_1$ is determined. For example, the quantization step $\delta_1$ can be set by the user, or calculated using a quantization parameter setting a compromise between compression and quality and entered by the user or defined by the encoder. Thus, such a quantization parameter can be the parameter λ, used in the rate-distortion cost function D+λ·R, where D represents the distortion introduced by the coding and R the rate used for coding. This function is used to make coding choices, typically a way of coding the image that minimises this function is sought.

As a variant, the quantization parameter can be QP, corresponding to the quantization parameter conventionally used in the AVC or HEVC standards. Thus, in the HEVC standard, the quantization step $\delta_1$ is determined by the equation $\delta_1$=levelScale[QP %6]<<(QP/6)) where levelScale [k]={40, 45, 51, 57, 64, 72} for k=0 . . . 5.

In a step E211, a prediction of the current block is determined using a conventional intra prediction mode. According to this conventional intra prediction, each predicted pixel is calculated only from the decoded pixels originating from the neighbouring blocks (reference pixels) located above the current block, and to the left of the current block. The way the pixels are predicted from the reference pixels depends on a prediction mode that is transmitted to the decoder, and that is chosen by the encoder from a predetermined set of modes known to the encoder and the decoder.

Thus, in HEVC there are 35 possible prediction modes: 33 modes that interpolate the reference pixels in 33 different angular directions, and 2 other modes: the DC mode in which each pixel of the predicted block is produced from the average of the reference pixels, and the PLANAR mode, that performs a planar and non-directional interpolation. This "conventional intra prediction" is well known and also used in the ITU-T H.264 standard (where there are only 9 different modes) as well as in the experimental JEM software available at the Internet address (https://jvet.hhi.fraunhofer.de/), where there are 67 different prediction modes. In all cases, the conventional intra prediction respects the two aspects mentioned above (prediction of the pixels from the neighbouring blocks and transmission to the decoder of an optimal prediction mode).

In step E211, the encoder thus chooses one of the available prediction modes from the predetermined list of prediction modes. One way to choose consists for example in evaluating all the prediction modes and keeping the prediction mode that minimises a cost function such as, classically, the rate-distortion cost.

In a step E212, the prediction mode chosen for the current block is coded from the neighbouring blocks of the current block. FIG. 2 shows a position example of the neighbouring blocks $A_b$ and $B_b$ of the current block $X_b$ to code the prediction mode of the current block $X_b$.

In step E212, the intra prediction mode chosen for the current block is coded using the intra prediction modes associated with the neighbouring blocks.

For example, the approach described in the HEVC standard for coding the prediction mode of the current block can be used. In the example in FIG. 2, such an approach consists in identifying the intra prediction mode $m_A$ associated with the block $A_b$ located above the current block, and the intra prediction mode $m_B$ associated with the block $B_b$ located just to the left of the current block. Depending on the value of $m_A$ and $m_B$, a list called MPM (for Most Probable Mode), containing 3 intra prediction modes, and a list called non-MPM, containing the 32 other prediction modes, are created.

According to the HEVC standard, in order to code the intra prediction mode of the current block, syntax elements are transmitted:
- a binary indicator indicating if the prediction mode to be coded for the current block is in the MPM list or not,
- if the prediction mode of the current block belongs to the MPM list, an index in the MPM list corresponding to the prediction mode of the current block is coded,
- if the prediction mode of the current block does not belong to the MPM list, an index in the non-MPM list corresponding to the prediction mode of the current block is coded.

In a step E213, the prediction residue R for the current block is constructed.

In step E213, in a standard manner, a predicted block P is constructed according to the prediction mode chosen in step E211. Then, the prediction residue R is obtained by calculating the difference for each pixel between the predicted block P and the original current block.

In a step E214, the prediction residue R is transformed into $R_T$.

In step E214, a frequency transform is applied to the residue block R in order to produce the block $R_T$ comprising transform coefficients. The transform could be a DCT-type transform for example. It is possible to choose the transform to be used from a predetermined set of transforms $E_T$ and to inform the decoder of the transform used.

In a step E215, the transformed residue block $R_T$ is quantized using for example a scalar quantization of quantization step $\delta_1$. This produces the quantized transformed prediction residue block $R_{TQ}$.

In a step E216, the coefficients of the quantized block $R_{TQ}$ are coded by an entropy encoder. For example, the entropy coding specified in the HEVC standard can be used.

In a known manner, the current block is decoded by dequantizing the coefficients of the quantized block $R_{TQ}$, then applying the inverse transform to the dequantized coefficients to obtain the decoded prediction residue. The prediction is then added to the decoded prediction residue in order to reconstruct the current block and obtain its decoded version. The decoded version of the current block can then be used later to spatially predict other neighbouring blocks of the image or to predict blocks of other images by inter-image prediction.

Step E22 for coding the block according to the second coding mode M2, according to a particular embodiment of the invention, is described below. According to the particular embodiment described here, the second coding mode corresponds to an ILR prediction coding.

In a step E220, a local predictor PL for the current block is determined. According to the coding mode described here, the pixels of the current block are predicted by previously reconstructed pixels of a neighbouring block of the current block or of the current block itself.

Preferably, for the prediction, pixels that are as close as possible to the pixel to be predicted are chosen. This is why it is referred to as a local predictor. The local predictor PL can also be assimilated to a prediction mode of the current block associated with the second coding mode M2. According to this interpretation, in the particular embodiment described here, the first coding mode uses a first group of intra prediction modes, for example the intra prediction modes defined by the HEVC standard, and the second coding mode, here the ILR mode, uses a second group of prediction modes distinct from the first group of intra prediction modes.

The local predictor PL can be unique or it can be selected from a set of predetermined local predictors (second group of prediction modes).

According to an embodiment variant, 4 local predictors are defined. Thus, if we call X a current pixel to be predicted from the current block, A the pixel located immediately to the left of X, B the pixel located immediately to the left of and above X, C the pixel located immediately above X, as illustrated in FIG. 3 showing a current block $X_b$, 4 local predictors PL1, PL2, PL3, PL4 can be defined as follows:

PL1(X)=min(A,B) if C≥max(A,B)
    max(A,B) if C≤min(A,B)
    A+B−C otherwise
PL2(X)=A
PL3(X)=B
PL4(X)=C where min(A,B) corresponds to the function returning the smallest value between the value of A and the value of B and max(A,B) corresponds to the function returning the largest value between the value of A and the value of B.

In step E220, the local predictor PL used for the current block is determined. In other words, the same local predictor will be used for all the pixels of the current block, i.e. the same prediction function. For this purpose, several embodiment variants are possible.

The coding of the current block with each of the predictors can be simulated (similarly to an optimisation to choose a coding mode for the current block), and the local predictor that optimises a cost function (for example, that minimises the D+λ·R function, where R is the rate used to code the block, D is the distortion of the decoded block relative to the original block, and λ is a parameter set by the user) is selected.

Or, in order to limit the complexity of selecting a local predictor for the current block, an orientation of the texture of the previously coded pixels is analysed. For example, the previously coded pixels in the block that are located above or to the left of the current block are analysed using a Sobel-type operator. If it is determined that:
- the orientation is horizontal, the local predictor PL2 is selected,
- the orientation is vertical, the local predictor PL3 is selected,
- the orientation is diagonal, the local predictor PL4 is selected,
- if no orientation emerges, the local predictor PL1 is selected.

A syntax element is coded in the data stream STR to indicate to the decoder which local predictor was used to predict the current block.

In a step E221, a quantization step $\delta_2$ is determined. For example, the quantization step $\delta_2$ depends on the same quantization parameter as the quantization step $\delta_1$ that would be determined in step E210 if the current block was coded according to the first coding mode.

In a step E222, a prediction residue R1 is calculated for the current block. For this purpose, once the local predictor is chosen, for each current pixel of the current block:
- the current pixel X of the current block is predicted by the selected local predictor PL, using either pixels outside the block and already reconstructed (and thus available with their decoded value), or pixels previously reconstructed in the current block, or both, in order to obtain a predicted value PRED. In all cases, the predictor PL uses previously reconstructed pixels. In FIG. 3, it can be seen that the pixels of the current block located on the first row and/or the first column of the current block will use as reference pixels (to construct the predicted value PRED) pixels outside the block and already reconstructed (pixels in grey in FIG. 3) and possibly already reconstructed pixels of the current block. For the other pixels of the current block, the reference pixels used to construct the predicted value PRED are located inside the current block;

the difference DIFF between PRED and X is quantized into a value Q(X), by a $\delta_2$ quantization step scalar quantizer, by Q(X)=ScalarQuant(DIFF)=ScalarQuant ($\delta_2$, X-PRED), the scalar quantizer being for example a nearest-neighbour scalar quantizer such as:

$$ScalarQuant(\Delta, x) = \text{floor}\left(\frac{x + \frac{\Delta}{2}}{\Delta}\right).$$

Q(X) is the quantized residue associated with X. It is calculated in the spatial domain, i.e. calculated directly from the difference between the predicted value PRED of the pixel X and the original value of X. Such a quantized residue Q(X) for the pixel X is stored in a quantized prediction residue block $R1_Q$, that will be coded later;

the decoded predicted value P1(X) of X is calculated by adding to the predicted value PRED the dequantized value of the quantized residue Q(X). The decoded predicted value P1(X) of X is thus obtained by P1(X)=PRED+ScalarDequant($\delta_2$, Q(X)). For example, the nearest scalar quantization inverse function is given by: ScalarDequant($\Delta$, x)=$\Delta \times$x.

The decoded predicted value P1(X) thus makes it possible to predict possible pixels that remain to be processed in the current block. Moreover, the block P1 comprising the decoded/reconstructed values of the pixels of the current block is the ILR predictor of the current block (as opposed to the conventional intra predictor).

The sub-steps described above are performed for all the pixels of the current block, in a scanning order that ensures that the pixels used for the prediction chosen from PL1, . . . , PL4 are available.

According to an embodiment variant, the scanning order of the current block is the lexicographical order, i.e. from left to right, and from top to bottom.

According to another embodiment variant, several scanning orders of the current block can be used, for example:
the lexicographical order, or
scanning the first column from top to bottom, then the column just to the right of it, etc., or,
scanning the diagonals one after the other.

According to this other variant, it is possible to simulate the coding cost associated with each of the scanning orders and to choose the best scanning order for the current block in terms of rate/distortion, then to code for the current block an item of information representative of the chosen scanning order.

At the end of step E222, the quantized residue block $R1_Q$ was determined. This quantized residue block $R1_Q$ must be coded for transmission to the decoder. The predictor P1 of the current block was also determined.

In a step E223, the quantized residue block $R1_Q$ is coded for transmission to the decoder. Any known approach such as the method described in HEVC can be used to code the quantized coefficients of a conventional prediction residue.

According to the particular embodiment of the invention described here, the values of the quantized residue block $R1_Q$ are coded using an entropy encoder in the data stream STR.

According to a particular embodiment of the invention, it is possible to determine and code an additional prediction residue R2 from the ILR predictor obtained for the current block. The coding of an additional prediction residue R2 is, however, optional. It is indeed possible to simply code the current block by its predicted version P1 and the quantized residue $R1_Q$.

In order to code an additional prediction residue R2 for the current block, the following steps are implemented.

In a step E224, the difference R2 between the predictor P1 and the original current block $X_b$ is calculated to form an additional residue R2: R2=$X_b$–P1. The following steps correspond to the conventional coding steps for this residue R2.

In a step E225, the residue R2 is transformed using a frequency transform in order to produce the block of coefficients $R2_T$.

The transform can be a DCT-type transform for example. It is possible to choose the transform to be used from a predetermined set of transforms $E_{T2}$ and to inform the decoder of the transform used. In this case, the set $E_{T2}$ can be different from the set $E_T$, in order to adapt to the particular statistics of the residue R2.

In a step E226, the block of coefficients $R2_T$ is quantized, for example using a scalar quantization of quantization step S. This produces the block $R2_{TQ}$.

The quantization step $\delta$ can be set by the user. It can also be calculated using another parameter A setting the compromise between compression and quality and entered by the user or the encoder. For example, the quantization step $\delta$ can correspond to the quantization step $\delta_1$ or be determined similarly to it.

In a step E227, the coefficients of the quantized block $R2_{TQ}$ are then transmitted in a coded manner. For example, the coding specified in the HEVC standard can be used.

In a known manner, the current block is decoded by dequantizing the coefficients of the quantized block $R2_{TQ}$, then applying the inverse transform to the dequantized coefficients to obtain the decoded prediction residue. The prediction P1 is then added to the decoded prediction residue in order to reconstruct the current block and obtain its decoded version $X_{rec}$.

The decoded version $X_{rec}$ of the current block can then be used later to spatially predict other neighbouring blocks of the image or to predict blocks of other images by inter-image prediction.

In a step E23, it is checked if the current block is the last block of the image to be processed by the coding method, taking into account the previously defined scanning order. If yes, the method proceeds to coding (step E25) the next image of the video, if any. If no, in a step E24, the subsequent block of the image to be processed is selected according to the previously defined scanning order of the image and the coding method proceeds to step E2, where the selected block becomes the current block to be processed.

FIG. 4 shows steps of the method for decoding a stream STR of coded data representative of a sequence of images $I_1$, $I_2$, . . . , $I_{Nb}$ to be decoded according to a particular embodiment of the invention.

For example, the data stream STR was generated via the coding method shown in relation to FIG. 1. The data stream STR is provided as input to a decoding device DEC, as described in relation to FIG. 7.

The decoding method decodes the stream image by image and each image is decoded block by block.

In a step E40, an image $I_j$ to be decoded is subdivided into blocks of an initial size determined at the encoder and known to the decoder. Each block will undergo a decoding operation consisting in a series of steps that are detailed hereafter. Blocks can be the same size or different sizes.

In an optional step E401, according to a particular embodiment of the invention, a threshold value is read from the data stream STR. This threshold values defines the maximum block size up to which the ILR coding mode was enabled to code a current block.

According to another particular embodiment of the invention, the threshold can be defined by default at the decoder.

In a step E41, a first block or sub-block $X_b$ to be decoded of the image $I_j$ is selected as the current block according to a predetermined scanning order of the image $I_j$. For example, it can be the first block in the lexicographical scanning order of the image.

In a step E42, it is determined whether the current block has a size less than or equal to the threshold. If the current block has a size less than or equal to the threshold, the process proceeds to step E421. Otherwise, the current block has a size greater than the threshold, the method proceeds to step E43 for decoding the current block according to the first coding mode.

The size of the current block can be read from the data stream or deduced from a partitioning of the block of initial size to which the current block belongs. Such a partitioning being coded in the data stream or deduced from the information coded for the block of initial size.

In step E421, an item of information indicating a coding mode for the current block is read from the data stream STR. According to the particular embodiment described here, this item of information indicates if the current block is coded according to a first coding mode M1 or according to a second coding mode M2. According to the particular embodiment described here, the first coding mode M1 corresponds to the conventional intra prediction coding of the current block, for example as defined according to the HEVC standard, and the second coding mode M2 corresponds to the In-Loop Residual (ILR) prediction coding.

In other particular embodiments, the first coding mode can correspond to a coding mode other than the INTRA prediction coding mode (not described here).

The step E43 for decoding the current block when the current block is coded according to the first coding mode M1 is described below.

In a step E430, a quantization step $\delta_1$ is determined. For example, the quantization step $\delta_1$ is determined from the quantization parameter QP read in step E401 or similarly to what was done at the encoder. For example, the quantization step $\delta_1$ can be calculated using the quantization parameter QP read in step E401. For example, the quantization parameter QP can be the quantization parameter conventionally used in the AVC or HEVC standards. Thus, in the HEVC standard, the quantization step $\delta_1$ is determined by the equation $\delta_1 = \text{levelScale}[QP \%6] << (QP/6)$ where levelScale $[k] = \{40, 45, 51, 57, 64, 72\}$ for $k = 0 \ldots 5$.

In a step E431, the prediction mode chosen to code the current block is decoded from the neighbouring blocks. For this purpose, as it was done at the encoder, the intra prediction mode chosen for the current block is coded using the intra prediction modes associated with the neighbouring blocks of the current block.

The construction of both MPM and non-MPM lists is strictly similar to what was done during coding. According to the HEVC standard, syntax elements of the following type are decoded:
- a binary indicator indicating if the prediction mode to be coded for the current block is in the MPM list or not,
- if the prediction mode of the current block belongs to the MPM list, an index in the MPM list corresponding to the prediction mode of the coded current block,
- if the prediction mode of the current block does not belong to the MPM list, an index in the non-MPM list corresponding to the prediction mode of the coded current block.

The binary indicator and the prediction mode index are thus read for the current block from the data stream STR, to decode the intra prediction mode of the current block.

In a step E432, the decoder constructs a predicted block P for the current block from the decoded prediction mode.

In a step E433, the decoder decodes the coefficients of the quantized block $R_{TQ}$ from the data stream STR, for example using the decoding specified in the HEVC standard.

In a step E434, the decoded block $R_{TQ}$ is dequantized, for example using a $\delta_1$ quantization step scalar dequantization. This produces the block of dequantized coefficients $R_{TQD}$.

In a step E435, an inverse frequency transform is applied to the block of dequantized coefficients $R_{TQD}$ in order to produce the decoded prediction residue block $R_{TQD}$. The transform could be an inverse DCT-type transform for example. It is possible to choose the transform to be used from a predetermined set of transforms $E_{T1}$ by decoding an indicator from the data stream STR.

In a step E436, the current block is reconstructed from the predicted block P obtained in step E432 and the decoded residue block $R_{TQDI}$ obtained in step E435, in order to produce the decoded current block $X_{rec}$, by $X_{rec} = P + R_{TQDI}$.

The step E44 for decoding the current block when the current block is coded according to the second coding mode M2 is described below.

In a step E440, the local predictor PL used to predict the pixels of the current block is determined. In the case where only one predictor is available, the local predictor is, for example, set by default at the decoder level and no syntax element needs to be read from the stream STR to determine it.

In the case where several local predictors are available, for example the predictors PL1-PL4 described above, a syntax element is decoded from the data stream STR to identify which local predictor was used to predict the current block. The local predictor is thus determined from that decoded syntax element.

In a step E441, the quantization step $\delta_2$ is determined, similarly to what was done at the encoder.

In a step E442, the quantized residue $R1_Q$ is decoded from the data stream STR. Any known approach such as the method described in HEVC can be used to decode the quantized coefficients of the conventional prediction residue.

In a step E443, the quantized residue block $R1_Q$ is dequantized using the quantization step $\delta_2$, in order to produce the dequantized residue block $R1_{QD}$.

In a step E444, when the dequantized residue block $R1_{QD}$ is obtained, the predicted block P1 is constructed using the local predictor PL determined in step E440.

In step E444, each pixel of the current block is predicted and reconstructed as follows:
the current pixel X of the current block is predicted by the selected predictor PL, using either pixels outside the block and already reconstructed, or previously reconstructed pixels of the current block, or both, in order to obtain a predicted value PRED. In all cases, the predictor PL uses previously decoded pixels;

the decoded predicted value P1(X) of the current pixel X is calculated by adding to the predicted value PRED the dequantized value of the prediction residue $R1_{QD}$ such that $P1(X)=PRED+R1_{QD}(X)$.

These steps are implemented for all the pixels of the current block, in a scanning order that ensures that the pixels used for the prediction chosen from PL1, . . . , PL4 are available. For example, the scanning order is the lexicographical order (from left to right, then rows from top to bottom).

According to a particular embodiment of the invention, the predicted block P1 comprising the decoded predicted values P1(X) of each pixel of the current block forms here the decoded current block $X_{rec}$.

According to another particular embodiment of the invention, it is considered here that an additional prediction residue was coded for the current block. It is therefore necessary to decode this additional prediction residue in order to reconstruct the decoded version of the current block $X_{rec}$.

For example, this other particular embodiment can be activated or not by default at the encoder and decoder level. Or, an indicator can be coded in the data stream with the block level information to indicate for each block coded according to the ILR coding mode if an additional prediction residue is coded. Or further, an indicator can be coded in the data stream with the image or sequence of images level information to indicate for all the blocks of the image or of the sequence of images coded according to the ILR coding mode if an additional prediction residue is coded.

When an additional prediction residue is coded for the current block, in a step E445, the coefficients of the quantized prediction residue $R2_{TQ}$ are decoded from the data stream STR, using means adapted to those implemented at the encoder, for example the means implemented in an HEVC decoder.

In a step E446, the block of quantized coefficients $R2_{TQ}$ is dequantized, for example using a scalar dequantization of quantization step $\delta_1$. This produces the block of dequantized coefficients $R2_{TQD}$.

In a step E447, an inverse frequency transform is applied to the block $R2_{TQD}$ in order to produce the decoded prediction residue block $R2_{TQDI}$.

The inverse transform could be an inverse DCT-type transform for example.

It is possible to choose the transform to be used from a predetermined set of transforms $E_{T2}$ and to decode the item of information informing the decoder of the transform to be used. In this case, the set $E_{T2}$ is different from the set $E_T$, in order to adapt to the particular statistics of the residue R2.

In a step E448, the current block is reconstructed by adding the predicted block P1 obtained in step E444 to the decoded prediction residue $R2_{TQDI}$.

In a step E45, it is checked if the current block is the last block of the image to be processed by the decoding method, taking into account the previously defined scanning order. If yes, the method proceeds to decoding (step E47) the next image of the video, if any. If not, in a step E46, the subsequent block of the image to be processed is selected according to the previously defined scanning order of the image and the decoding method proceeds to step E42, the selected block becoming the current block to be processed.

FIG. 5 illustrates a signal example STR comprising coded data representative of at least one block of an image according to a particular embodiment of the invention. For example, the signal STR can comprise a threshold value S indicating a maximum block size up to which the second coding mode M2 can be used as described above. This threshold value S can be coded at the image or sequence of images level when coding a video.

When it is not coded in the data stream STR, the threshold S is determined in a similar way at the encoder and the decoder.

When the block has a size less than or equal to the threshold S, the signal STR comprises a coded indicator TY indicating for the block a coding mode among the first coding mode and the second coding mode. When the TY indicator indicates that the block is coded according to the second coding mode, here the ILR mode, the signal then comprises coded values of quantized prediction residues $R1_Q$ and possibly coded values of quantized transformed prediction residues $R2_{TQ}$. When several local predictors are possible for the current block, the signal also comprises a local predictor PL coded indicator.

When the indicator TY indicates that the block is coded according to the first coding mode, here the conventional intra prediction mode, the signal then comprises coded values of quantized transformed prediction residues $R_{TQ}$, a binary indicator $i_{MPM}$ indicating whether or not the prediction mode to be coded for the current block is in the MPM list, and an index $idx_{MPM}$ indicating the index of current block prediction mode in the corresponding list.

When the block has a size above the threshold S, the signal then comprises data coded for the block originating from the coding of the block according to the first coding mode.

FIG. 6 shows the simplified structure of a coding device COD adapted to implement the coding method according to any one of the particular embodiments of the invention.

According to a particular embodiment of the invention, the steps of the coding method are implemented by computer program instructions. For this purpose, the coding device COD has the standard architecture of a computer and notably comprises a memory MEM, a processing unit UT, equipped for example with a processor PROC, and driven by the computer program PG stored in the memory MEM. The computer program PG comprises instructions for implementing the steps of the coding method as described above, when the program is executed by the processor PROC.

At initialisation, the code instructions of the computer program PG are for example loaded into a RAM memory (not shown) before being executed by the processor PROC. In particular, the processor PROC of the processing unit UT implements the steps of the coding method described above, according to the instructions of the computer program PG.

FIG. 7 shows the simplified structure of a decoding device DEC adapted to implement the decoding method according to any one of the particular embodiments of the invention.

According to a particular embodiment of the invention, the decoding device DEC has the standard architecture of a computer and notably comprises a memory MEMO, a processing unit UT0, equipped for example with a processor PROC0, and driven by the computer program PG0 stored in the memory MEMO. The computer program PG0 comprises instructions for implementing the steps of the decoding method as described above, when the program is executed by the processor PROC0.

At initialisation, the code instructions of the computer program PG0 are for example loaded into a RAM memory (not shown) before being executed by the processor PROC0. In particular, the processor PROC0 of the processing unit UT0 implements the steps of the decoding method described above, according to the instructions of the computer program PG0.

Although the present disclosure has been described with reference to one or more examples, workers skilled in the art will recognize that changes may be made in form and detail without departing from the scope of the disclosure and/or the appended claims.

What is claimed is:

1. A method for decoding a coded data stream representative of at least one image, said image being split into blocks, wherein the method comprises the following acts performed by a decoding device, for at least one block of the image, referred to as a current block:
   reading from the data stream a threshold value defining a block size,
   determining whether a size of the current block is less than or equal to said threshold value,
   if the size of the current block is less than or equal to said threshold value, decoding an item of information indicating a coding mode of the current block among a first coding mode and a second coding mode and reconstructing the current block according to the coding mode indicated by the decoded item of information, and
   if the size of the current block is greater than said threshold value, reconstructing the current block according to the first coding mode,
   the first coding mode corresponding to a coding mode according to which the current block is reconstructed using an inverse transform of a transformed prediction residue decoded for the current block, and the second coding mode corresponding to a coding mode according to which the current block is not reconstructed using an inverse transform of a transformed prediction residue decoded for the current block, but by:
      scanning each pixel of the current block according to a scanning order, said scanning comprising, for said pixel of the current block:
         obtaining a prediction of said pixel from another previously decoded pixel, said other previously decoded pixel belonging to said current block or to a previously decoded block of the image, and
         reconstructing said pixel from the prediction of said pixel obtained and a decoded prediction residue associated with said pixel.

2. The method according to claim 1, wherein said threshold value is 16 or 32 pixels.

3. The method according to claim 1, wherein the size of the current block corresponds to the total number of pixels in the current block.

4. The method according to claim 3, wherein said threshold value is 256 or 512 pixels.

5. A method for coding a data stream representative of at least one image, said image being split into blocks, wherein the method comprises the following acts performed by a coding device, for at least one block of the image, referred to as a current block:
   determining whether a size of the current block is less than or equal to a threshold value defining a block size, said threshold value being inserted in said data stream,
   if the size of the current block is less than or equal to said threshold value, coding an item of information indicating a coding mode of the current block among a first coding mode and a second coding mode, and coding the current block according to the coding mode indicated by the coded item of information, and
   if the size of the current block is greater than said threshold value, coding the current block according to the first coding mode,
   the first coding mode corresponding to a coding mode according to which the current block is coded using a transform of a prediction residue of the current block, the second coding mode corresponding to a coding mode according to which the current block is not coded using a transform of a prediction residue of the current block, but by:
      scanning each pixel of the current block according to a scanning order, said scanning comprising, for said pixel of the current block:
         obtaining a prediction of said pixel from another previously decoded pixel, said other previously decoded pixel belonging to said current block or to a previously decoded block of the image, and
         coding a prediction residue associated with said pixel and obtained from the prediction obtained for said pixel.

6. The method according to claim 5, wherein said threshold value is 16 or 32 pixels.

7. The method according to claim 5, wherein the size of the current block corresponds to the total number of pixels in the current block.

8. The method according to claim 7, wherein said threshold value is 256 or 512 pixels.

9. A device for decoding a coded data stream representative of at least one image, said image being split into blocks, wherein the device comprises a processor configured, for at least one block of the image, referred to as a current block, to:
   reading from the data stream a threshold value defining a block size,
   determine whether a size of the current block is less than or equal to said threshold value,
   if the size of the current block is less than or equal to said threshold value, decode an item of information indicating a coding mode of the current block among a first coding mode and a second coding mode, and reconstruct the current block according to the coding mode indicated by the decoded item of information, and
   if the size of the current block is greater than said threshold value, reconstruct the current block according to the first coding mode,
   the first coding mode corresponding to a coding mode according to which the current block is reconstructed using an inverse transform of a transformed prediction residue decoded for the current block, the second coding mode corresponding to a coding mode according to which the current block is not reconstructed using an inverse transform of a transformed prediction residue decoded for the current block, but by:
      scanning each pixel of the current block according to a scanning order, said scanning comprising, for said pixel of the current block:
         obtaining a prediction of said pixel from another previously decoded pixel, said other previously decoded pixel belonging to said current block or to a previously decoded block of the image, and
         reconstructing said pixel from the prediction of said pixel obtained and a decoded prediction residue associated with said pixel.

10. A device for coding a data stream representative of at least one image, said image being split into blocks, wherein the device comprises a processor configured, for at least one block of the image, referred to as a current block, to:
- determine whether a size of the current block is less than or equal to a threshold value defining a block size, said threshold value being inserted in said data stream,
- if the size of the current block is less than or equal to said threshold value, code an item of information indicating a coding mode of the current block among a first coding mode and a second coding mode, and code the current block according to the coding mode indicated by the coded item of information, and
- if the size of the current block is greater than said threshold value, code the current block according to the first coding mode,
- the first coding mode corresponding to a coding mode according to which the current block is coded using a transform of a prediction residue of the current block, the second coding mode corresponding to a coding mode according to which the current block is not coded using a transform of a prediction residue of the current block, but by:
  - scanning each pixel of the current block according to a scanning order, said scanning comprising, for said pixel of the current block:
    - obtaining a prediction of said pixel from another previously decoded pixel, said other previously decoded pixel belonging to said current block or to a previously decoded block of the image,
    - coding a prediction residue associated with said pixel and obtained from the prediction obtained for said pixel.

11. A non-transitory computer-readable medium comprising instructions stored thereon for implementing a decoding method for decoding a coded data stream representative of at least one image, when said instructions are executed by a processor of a decoding device, said image being split into blocks, wherein the instructions configure the decoding device to implement the following acts for at least one block of the image, referred to as a current block:
- reading from the data stream a threshold value defining a block size,
- determining whether a size of the current block is less than or equal to said threshold value,
- if the size of the current block is less than or equal to said threshold value, decoding an item of information indicating a coding mode of the current block among a first coding mode and a second coding mode and reconstructing the current block according to the coding mode indicated by the decoded item of information, and
- if the size of the current block is greater than said threshold value, reconstructing the current block according to the first coding mode,
- the first coding mode corresponding to a coding mode according to which the current block is reconstructed using an inverse transform of a transformed prediction residue decoded for the current block, and the second coding mode corresponding to a coding mode according to which the current block is not reconstructed using an inverse transform of a transformed prediction residue decoded for the current block, but by:
  - scanning each pixel of the current block according to a scanning order, said scanning comprising, for said pixel of the current block:
    - obtaining a prediction of said pixel from another previously decoded pixel, said other previously decoded pixel belonging to said current block or to a previously decoded block of the image, and
    - reconstructing said pixel from the prediction of said pixel obtained and a decoded prediction residue associated with said pixel.

12. A non-transitory computer-readable medium comprising instructions stored thereon for implementing a coding method for coding a data stream representative of at least one image, when said instructions are executed by a processor of a coding device, said image being split into blocks, wherein the instructions configure the coding device to implement the following acts for at least one block of the image, referred to as a current block:
- determining whether a size of the current block is less than or equal to a threshold value defining a block size, said threshold value being inserted in said data stream,
- if the size of the current block is less than or equal to said threshold value, coding an item of information indicating a coding mode of the current block among a first coding mode and a second coding mode, and coding the current block according to the coding mode indicated by the coded item of information, and
- if the size of the current block is greater than said threshold value, coding the current block according to the first coding mode,
- the first coding mode corresponding to a coding mode according to which the current block is coded using a transform of a prediction residue of the current block, the second coding mode corresponding to a coding mode according to which the current block is not coded using a transform of a prediction residue of the current block, but by:
  - scanning each pixel of the current block according to a scanning order, said scanning comprising, for said pixel of the current block:
    - obtaining a prediction of said pixel from another previously decoded pixel, said other previously decoded pixel belonging to said current block or to a previously decoded block of the image, and
    - coding a prediction residue associated with said pixel and obtained from the prediction obtained for said pixel.

13. The method according to claim 1, further comprising adjusting said threshold value depending on a maximum size of an initial split block of the image.

14. The method according to claim 5, further comprising adjusting said threshold value depending on a maximum size of an initial split block of the image.

15. The method according to claim 1, further comprising adjusting said threshold value depending on a content of the images to be decoded.

16. The method according to claim 5, further comprising adjusting said threshold value depending on a content of the images to be coded.

* * * * *